United States Patent
Lopez et al.

(10) Patent No.: US 10,173,675 B2
(45) Date of Patent: Jan. 8, 2019

(54) METHOD AND APPARATUS IN A MOTOR VEHICLE FOR AUTOMATED DRIVING

(71) Applicant: VOLKSWAGEN AG, Wolfsburg (DE)

(72) Inventors: David Perdomo Lopez, Braunschweig (DE); Christian Jördens, Braunschweig (DE); Lutz Junge, Braunschweig (DE); Michael Darms, Lehre (DE)

(73) Assignee: Volkswagen AG (DE)

( * ) Notice: Subject to any disclaimer, the term of this patent is extended or adjusted under 35 U.S.C. 154(b) by 218 days.

(21) Appl. No.: 15/364,441

(22) Filed: Nov. 30, 2016

(65) Prior Publication Data

US 2017/0158193 A1 Jun. 8, 2017

(30) Foreign Application Priority Data

Dec. 4, 2015 (DE) ........................ 10 2015 224 338

(51) Int. Cl.
*B60W 30/00* (2006.01)
*B60W 30/095* (2012.01)
(Continued)

(52) U.S. Cl.
CPC .. *B60W 30/0956* (2013.01); *B60W 30/18154* (2013.01); *B60W 40/04* (2013.01);
(Continued)

(58) Field of Classification Search
CPC ....... B60W 30/0956; B60W 30/18154; B60W 40/04; B60W 2420/54; B60W 2420/52;
(Continued)

(56) References Cited

U.S. PATENT DOCUMENTS 8,761,991 B1   6/2014 Ferguson et al.
2011/0295424 A1* 12/2011 Johnson ............... A01D 34/008
                                                                700/248
(Continued)

FOREIGN PATENT DOCUMENTS

DE      102005020429 A1    11/2006
DE      102009008745 A1     8/2010
(Continued)

OTHER PUBLICATIONS

Search Report from German Patent Application No. 10 2015 224 338.9; dated Sep. 22, 2016.
(Continued)

*Primary Examiner* — Jason Holloway
(74) *Attorney, Agent, or Firm* — Barnes & Thornburg LLP

(57) ABSTRACT

A method for the automated driving of a motor vehicle which provides environment data, detects objects in the environment data, selects a current scenario by a scenario-interpretation apparatus on the basis of the detected objects, wherein a scenario has at least one elementary situation which is assigned at least one monitoring region and an enable criterion as attributes, and in addition successively for each of the elementary situations of the current scenario, estimates a destination point, plans a trajectory to the destination point by a maneuver-planning apparatus, interrogates information about a monitoring region from the environment-perception apparatus by the scenario-interpretation apparatus, checks for the presence of the at least one enable criterion by the scenario-interpretation apparatus, and if the at least one enable criterion is satisfied, automated driving along the trajectory as far as the destination point by a controller. Also disclosed is an associated device.

10 Claims, 16 Drawing Sheets

(51) Int. Cl.
  *G05D 1/00* (2006.01)
  *G05D 1/02* (2006.01)
  *G08G 1/16* (2006.01)
  *B60W 30/18* (2012.01)
  *B60W 40/04* (2006.01)
  *H04L 29/08* (2006.01)

(52) U.S. Cl.
  CPC ......... *G05D 1/0088* (2013.01); *G05D 1/0238* (2013.01); *G08G 1/16* (2013.01); *G08G 1/161* (2013.01); *G08G 1/166* (2013.01); *G08G 1/167* (2013.01); *B60W 2420/42* (2013.01); *B60W 2420/52* (2013.01); *B60W 2420/54* (2013.01); *B60W 2550/10* (2013.01); *B60W 2550/22* (2013.01); *B60W 2550/408* (2013.01); *B60W 2720/24* (2013.01); *B60Y 2300/18158* (2013.01); *H04L 67/12* (2013.01)

(58) Field of Classification Search
  CPC ......... B60W 2420/42; B60W 2720/24; B60W 2550/10; B60W 2550/408; B60W 2550/22; G05D 1/0238; G05D 1/0088; G08G 1/16; G08G 1/167; G08G 1/166; G08G 1/161; H04L 67/12; B60Y 2300/18158
  See application file for complete search history.

(56) References Cited

U.S. PATENT DOCUMENTS

| | | | |
|---|---|---|---|
| 2015/0006014 A1* | 1/2015 | Wimmer | B60K 26/02 701/23 |
| 2015/0051781 A1* | 2/2015 | Schnieders | B60W 30/00 701/23 |
| 2016/0176399 A1* | 6/2016 | Takagi | G08G 1/166 701/301 |
| 2017/0132934 A1* | 5/2017 | Kentley | G08G 1/202 |
| 2017/0243485 A1* | 8/2017 | Rubin | H04W 72/005 |
| 2017/0364082 A1* | 12/2017 | Taieb | G01C 21/32 |

FOREIGN PATENT DOCUMENTS

| | | |
|---|---|---|
| DE | 102010018333 A1 | 10/2011 |
| EP | 3023963 A1 | 5/2016 |
| WO | 2015008588 A1 | 1/2015 |

OTHER PUBLICATIONS

Alonso et al.; Autonomous vehicle control systems for safe crossroads; Transportation Research. Part C; Emerging Technologies; Jun. 5, 2011.

Search Report for European Patent Application No. 16197937.2; dated Apr. 12, 2017.

\* cited by examiner

METHOD AND APPARATUS IN A MOTOR VEHICLE FOR AUTOMATED DRIVING

PRIORITY CLAIM

This patent application claims priority to German Patent Application No. 10 2015 224 338.9, filed 4 Dec. 2015, the disclosure of which is incorporated herein by reference in its entirety.

SUMMARY

Illustrative embodiments relate to a method and to a device in a motor vehicle for automated driving in an environment.

BRIEF DESCRIPTION OF THE DRAWINGS

Disclosed embodiments will be explained in more detail below with reference to the drawings, in which:

FIG. 7b shows a key for the elementary situations shown in FIG. 7a;

DETAILED DESCRIPTION

Figure 1:
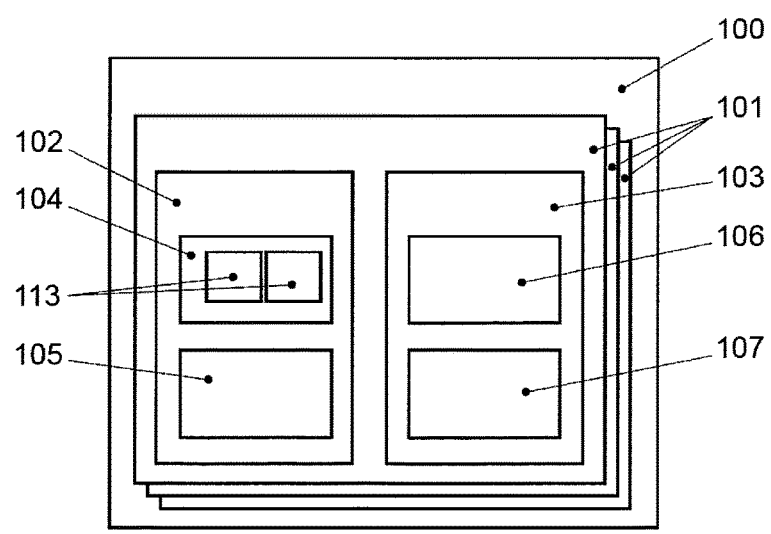
FIG. 1 shows a schematic illustration of components of a typical scenario.

Modern motor vehicles have a multiplicity of assistance systems which assist the driver in driving the vehicle. In this context, there is increasing use of semi-autonomous and autonomous systems which permit semi-automatic or fully automatic control of the motor vehicle. The processing of the data sets occurring here gives rise to a large amount of expenditure on computing.

DE 10 2010 010 856 A1 discloses a method for automatically assisting a driver of a motor vehicle. In this context, a driving lane corridor out of which the motor vehicle can move from the current position is determined on the basis of the position data of the motor vehicle and the data of the electronic image of the surroundings of the vehicle, wherein the driving lane corridor is bounded on each of its two sides by a driving lane corridor edge, and when a distance of the motor vehicle from a driving lane corridor edge is undershot a transverse-guidance and/or longitudinal-guidance intervention, which can be overridden by the driver, is carried out when a steering torque is applied to a steering system of the motor vehicle by changing the steering transmission ratio characteristic curve of an active steering system of the motor vehicle, by changing the accelerator pedal characteristic curve of the accelerator pedal of the motor vehicle, and/or by changing the engine torque of the engine of the motor vehicle.

DE 10 2010 018 333 A1 discloses a method and an evaluation device for evaluating information of at least one image recorded by at least one optical camera. A method for evaluating information of at least one image recorded by at least one optical camera is described, wherein the at least one optical camera is a component of a vehicle. The method has the following operations: At least one image is recorded by means of at least one optical camera at least during travel of the vehicle on a freeway. Furthermore, an anticipated profile of the underlying surface in the surroundings of the vehicle is determined by means of at least one detection device of the vehicle. In addition, at least one area of the at least one image, which includes at least one part of the determined anticipated profile of the underlying surface in the surroundings of the vehicle, is detected. Furthermore, image information contained in the at least one detected area of the at least one image is evaluated.

DE 10 2009 008 745 A1 discloses a method and a system for automatic traffic control. In this context, traffic-relevant information or information which relates to road traffic and is about an environment or the surroundings is detected automatically by a plurality of road users or by traffic infrastructure (e.g., apparatuses which detect and/or perform closed-loop control of traffic) and transmitted as environment data to a central control unit. The environment data is then displayed by the central control unit in a general environment model, with the result that this general environment model describes the environment of the road users. To assist the traffic control of the road users, the traffic control data which relates to an environment of a respective road user is transported automatically to this road user from the general environment model by the central control unit.

The disclosed embodiments are based on the technical problem of making available a method and a device for automatically driving a motor vehicle in an environment, in which method and device there is a reduced need for computational expenditure for the interpretation of the environment data.

The technical problem is solved according to the disclosed embodiments by a method and a device. A scenario is to be, in the text which follows, a set of elementary situations which are chronologically ordered and connected to one another. Such a scenario can be, for example, turning left, driving straight ahead or turning right at a junction.

An elementary situation denotes a moment or a time period within a scenario. The elementary situation comprises here a scene and information of the motor vehicle.

A scene contains scenery, wherein the scenery comprises static objects in the environment. The static objects are, for example, underlying surface markings, road signs etc. In addition, the scene also comprises dynamic objects such as, for example, traffic light phases, other road users, etc.

A method for the automated driving of a motor vehicle is made available, comprising the following operations: providing environment data, detecting objects in the environment data by means of an environment-perception apparatus, selecting a current scenario from a provided set of known scenarios by means of a scenario-interpretation apparatus on the basis of the detected objects, wherein a scenario has at least one elementary situation, and wherein each elementary situation is assigned at least one monitoring region and an enable criterion as attributes, and in addition successively for each of the elementary situations of the current scenario: estimating a destination point for the currently present elementary situation by means of the scenario-interpretation apparatus, planning a trajectory to the destination point by means of a maneuver-planning apparatus, interrogating information about a monitoring region, associated with the elementary situation, from the environment-perception apparatus by means of the scenario-interpretation apparatus, checking for the presence of the at least one enable criterion, associated with the elementary situation, on the basis of the interrogated information by means of the scenario-interpretation apparatus, and if the at least one enable criterion is satisfied, automated driving along the trajectory as far as the destination point by controlling at least one actuator system of the motor vehicle by means of a controller.

In addition, a device is provided for the automated driving of a motor vehicle, comprising: an environment-perception apparatus for detecting objects in provided environment data, a scenario-interpretation apparatus for selecting a current scenario from a provided set of known scenarios on the basis of the detected objects, wherein a scenario has at least one elementary situation, and wherein each elementary situation is assigned at least one monitoring region and an enable criterion as attributes, a maneuver-planning apparatus, and a controller, wherein the scenario-interpretation apparatus is designed to estimate a destination point for a currently present elementary situation to interrogate information about the monitoring region, associated with the elementary situation, of the environment-perception apparatus, and to check for the presence of the at least one enable criterion of the current elementary situation on the basis of the interrogated information, and wherein the controller is designed to drive the motor vehicle, insofar as the at least one enable criterion is satisfied, along a trajectory, planned by the maneuver-planning apparatus, as far as the destination point in an automated state by controlling at least one actuator system of the motor vehicle, and the scenario-interpretation apparatus is also designed to process, after the reaching of the destination point, a subsequent elementary situation of the current scenario.

The core concept of the disclosed embodiments is to improve scenario interpretation. For this purpose, a scenario is decomposed into a plurality of elementary situations. The elementary situations have in each case at least one monitoring region and one enable criterion as attributes assigned to them. The concept behind this is not to evaluate all the information items but rather only the information items about the environment of the motor vehicle which are relevant to the current elementary situation.

If a specific scenario is detected or selected from a provided set of scenarios, for example, turning left at a junction, by the scenario-interpretation apparatus, this scenario comprises a plurality of elementary situations which must be run through successively. In each current elementary situation, the entire environment of the motor vehicle then can or need no longer be monitored but rather only a monitoring region which is assigned to this elementary situation.

If the motor vehicle is located, for example, at the start of the scenario in an elementary situation before a junction without a traffic light which regulates the traffic and there is a pedestrian crossing (i.e., pedestrians always have precedence), the scenario-interpretation apparatus interprets that the motor vehicle is in an elementary situation without a traffic light and the monitoring region can then merely comprise the pedestrian crossing and the areas to the left and right of the pedestrian crossing on the sidewalk. In this monitoring region it is then checked whether the enable criterion which is assigned to the current elementary situation is satisfied. If it is provided, for example, as an enable criterion that there are no pedestrians present on the pedestrian crossing or in the vicinity to the left and right thereof, the scenario-interpretation apparatus interrogates from the environment-perception apparatus whether pedestrians are present in the region. If the scenario-interpretation apparatus then receives from the environment-perception apparatus the information that there are no pedestrians present, the enable criterion is satisfied and the scenario-interpretation apparatus brings about automated driving to a destination point estimated by the scenario-interpretation apparatus. Subsequently, the next elementary situation is then processed.

The decomposition of the scenario into a plurality of elementary situations has the benefit that a complex scenario in the road traffic can be resolved within the scope of partial operations. The decomposition into elementary situations makes it possible that in each case just a partial region of the environment has to be monitored, as a result of which only a reduced data set ever has to be processed or evaluated. This results in a considerable reduction in the expenditure on computing.

The set of provided scenarios comprises here, for example, turning left or turning right at a T junction or an X junction, driving straight ahead at an X junction with and without a road sign (stop sign, priority sign) or with a traffic light system which regulates the traffic. A scenario can be provided or learnt in advance, for example, for turning from a public road into a private driveway etc.

To select the scenario, the scenario-interpretation apparatus may also access information on a planned route, which information is provided by the maneuver-planning apparatus. The route comprises here, for example, the roads which are to be driven on from a starting point up to a destination of the automated driving. By taking into account the route it is easily possible to estimate a scenario, for example, turning left, early, if the route provides such a maneuver.

In at least one disclosed embodiment there is provision that the environment data is provided by at least one sensor system, where the at least one sensor system detects the environment of the motor vehicle. Possible sensor systems here are all known sensor systems such as, for example, cameras, ultrasonic sensors, laser scanners, radar sensors, TopView cameras etc.

In at least one disclosed embodiment there is provision that the environment data is alternatively or additionally provided as a map of the environment. This can be, for example, a road map in which in addition to the profile of the roads, further information such as, for example, road signs, priority rules, traffic light systems, etc. is stored. Such a road map facilitates, by means of the information stored therein, the selection of a scenario since, for example, even in the case of incomplete environment data it is possible to differentiate between a T junction and an X junction with a high level of probability.

In a further disclosed embodiment it is provided that the environment data is alternatively or additionally made available via a communication interface. This makes it possible to take into account, for example, Car2X data which is made available by other motor vehicles or traffic control systems.

In at least one disclosed embodiment there is provision that the scenario-interpretation apparatus continuously checks whether the selected current scenario is still present, or there is a need for a change in the current scenario. This permits dynamic adaptation of the current scenario to the environment. For example, in this way a scenario which is erroneously selected on the basis of a lack of data from the environment-perception apparatus can be corrected. If, for example, a T junction is selected and, as the vehicle approaches the junction it becomes apparent that it is not a T junction but rather an X junction, this can be corrected by a corresponding scenario then being selected for the X junction.

In at least one disclosed embodiment there is provision that within the at least one monitoring region of an elementary situation future trajectories of detected objects are predicted by means of a prediction apparatus. This makes it possible for the behavior of objects to be predicted or estimated in the future. By means of the estimated future trajectories it is possible to estimate where the objects will be located, where they will be positioned relative to the motor vehicle and whether in the current elementary situation an object is relevant for the motor vehicle or has to be taken into account.

In at least one disclosed embodiment there is also provision that an enable criterion is that a trajectory of the motor vehicle to the nearest destination point is free of collisions with trajectories of other objects. This permits conflict-free, automated driving as far as the corresponding destination point of the current elementary situation. To increase the safety, a safety corridor which has to be complied with to avoid collisions, can be additionally defined around the trajectories.

At least one disclosed embodiment provides that at least one elementary situation has a further attribute, wherein the further attribute is a specific object whose presence is interrogated from the environment-perception apparatus by means of the scenario-interpretation apparatus. In this way, additional information such as, for example, a specific road sign, can be stored. Furthermore, an associated enable criterion can also be additionally stored with the object.

In a further disclosed embodiment there is provision that the estimation of the destination point is dynamically adapted by the scenario-interpretation apparatus on the basis of the information interrogated from the environment-perception apparatus. The capability of dynamic adaptation of a destination point permits a flexible reaction to the conditions or changes in the environment of the motor vehicle. This may be necessary, for example, if information which was previously not yet available during the original estimation of the destination point becomes available in the current elementary situation. It is therefore possible, for example, to react flexibly to roadworks which are only detected when the vehicle approaches.

It is generally always possible for automated driving to be influenced or aborted. The driver of the motor vehicle can, for example, always intervene in the automated driving or other apparatuses of the vehicle which are provided for this purpose can stop or correct the automated driving. If, for example, a collision takes place with another object, the automated driving can be aborted and the motor vehicle brought to a standstill.

FIG. 1 shows a schematic illustration of the structure of a scenario 100. A scenario 100 is, for example, turning left at a junction. The scenario comprises at least one elementary situation 101. If the scenario 100 comprises a plurality of elementary situations 101, they are ordered chronologically and connected to one another. Each elementary situation 101 comprises here a scene 102 and a description of the state 103 of the motor vehicle. The scene 102 comprises, for example, a scenery 104 and dynamic elements 105. The scenery 104 comprises all the static objects 113 of the environment, and the dynamic elements 105 comprise, for example, traffic light phases etc. The state 103 of the motor vehicle comprises, for example, an action 106 of the driver and automated actions 107 of a controller.

Figure 2:
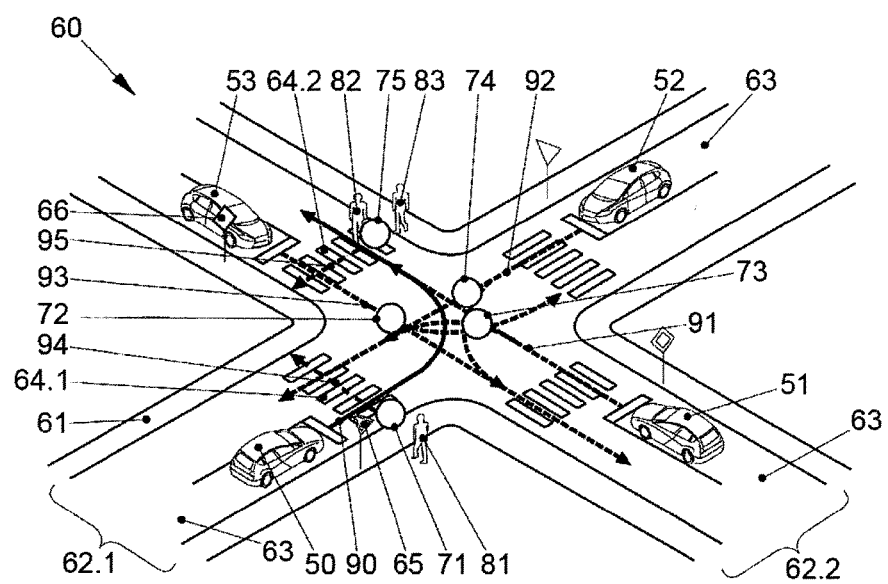
FIG. 2 shows a schematic illustration of a typical traffic situation at an X junction explaining possible conflict points when turning left.

FIG. 2 shows a schematic illustration of a typical traffic situation 60 at a junction 61 explaining possible conflict points 71, 72, 73, 74, 75 which can occur with other road users when a motor vehicle 50 turns left. The intersecting roads 62.1, 62.2 each have here one lane 63 per direction. In each case one motor vehicle 50, 51, 52, 53 is coming from each direction of the junction 61. In addition there is also a plurality of pedestrians 81, 82, 83 which are crossing, or which want to cross, the roads 62.1, 62.2 at pedestrian crossings 64.1, 64.2. Depending on how the other motor vehicles 51, 52, 53 plan to carry on driving, conflict points 72, 73, 74, come about for the motor vehicle 50 as it turns left, and the trajectories 90, 91, 92, 93 of the motor vehicles 50, 51, 52, 53 can collide with one another at these conflict points 72, 73, 74. Furthermore, there are two possible conflict points 71, 75 of the trajectory 90 of the motor vehicle 50 with the trajectories 94, 95 of the pedestrians 81, 82, 83.

A first conflict point 71 arises with a pedestrian 81 coming from the right. The trajectory 94 of the pedestrian 81 and the trajectory 90 of the motor vehicle 50 intersect. The motor vehicle must consequently wait until the pedestrian 81 has crossed the pedestrian crossing 64.1. Only then can the motor vehicle 50 pass over the pedestrian crossing 64.1. A further conflict point 72 subsequently arises with the motor vehicle 53 coming from the left, since the trajectories 90, 93 intersect. Depending on the traffic rules which are currently applicable for the traffic situation 60, the motor vehicle 50 must allow the motor vehicle 53 which is coming from the left to pass. Here, for the road 62.1, on which the motor vehicle 50 is located, there is a "give way" sign 65, and for the road 62.2 on which the other motor vehicle 53 is located there is a priority sign 66. The motor vehicle 50 must therefore wait until the other motor vehicle 53 has passed through the junction 61. Once this has taken place, the next conflict points 73, 74 are with motor vehicles 51, 52 coming from the right and from the opposite direction, respectively. These motor vehicles 51, 52 respectively have priority in the traffic situation 60, with the result that the motor vehicle 50 must wait for them to pass. The possibility of a collision with the pedestrians 82, 83 which wish to cross the pedestrian crossing 64.2 constitutes the last conflict point 75. The motor vehicle 50 must also wait here until they have crossed the pedestrian crossing 64.2.

The conflict points 71, 72, 73, 74, 75 clarify in this example that the traffic situation 60 can be decomposed into a plurality of partial problems or partial operations. The traffic situation 60 then constitutes overall in the sense of the disclosed embodiments a scenario which corresponds to turning left from a single-lane road 62.1 at an X junction 61 onto a single-lane road 62.2 without priority. The situations or problems relating to the individual conflict points 71, 72, 73, 74, 75 then correspond to the elementary situations of the scenario.

FIGS. 3a to 3e show a schematic illustration of the traffic situation already shown in FIG. 2 at an X junction explaining the possible maneuvers taking into account different priority rules and rights of way. Each of the illustrations corresponds here to a scenario.

Generally, at the X junction there are three possible maneuvers which can be executed by the motor vehicle: driving straight ahead, turning right and turning left. In this context, a different scenario arises for each of the possibilities, wherein the scenarios can each be composed of different elementary situations.

Figure 3A:
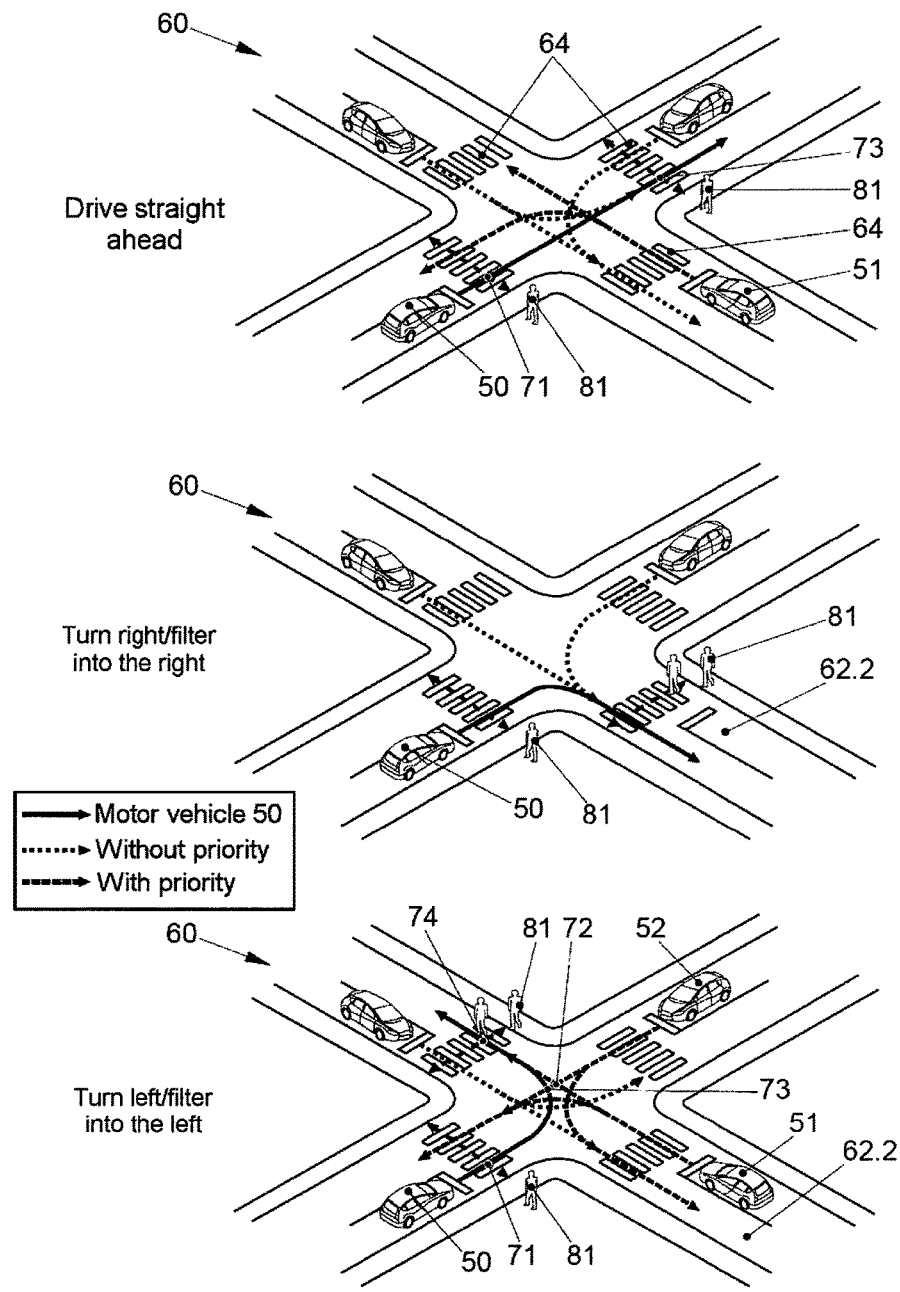
FIG. 3a shows a schematic illustration of a typical traffic situation at an X junction explaining different scenarios taking into account the right before left priority rule.

FIG. 3a shows the three maneuvers or scenarios when the rights of way are regulated according to the right before left rule. In all three scenarios, the rights of the pedestrians 81 on the respective pedestrian crossing 64 are to be considered here. If the motor vehicle 50 is driving straight ahead, there is a conflict point 71 with a pedestrian from the right. Subsequently there is a conflict point 72 with another motor vehicle 51 from the right, and a further conflict point 73 with a pedestrian 81 from the right.

In the scenario in which the motor vehicle 50 wishes to turn to the right, it is necessary to wait for the pedestrian 81 from the right, and subsequently for pedestrians 81 who wish to cross the road 62.2 into which the motor vehicle 50 is turning. When the vehicle turns left, a conflict point 71 arises with a pedestrian 81 from the right, and subsequently a conflict point 72 arises with another motor vehicle 51 from the right, and a conflict point 73 arises with an oncoming motor vehicle 52, and finally a last conflict point 74 arises with pedestrians 81 who are crossing the road 62.2 into which the motor vehicle 50 is turning.

Figure 3B:
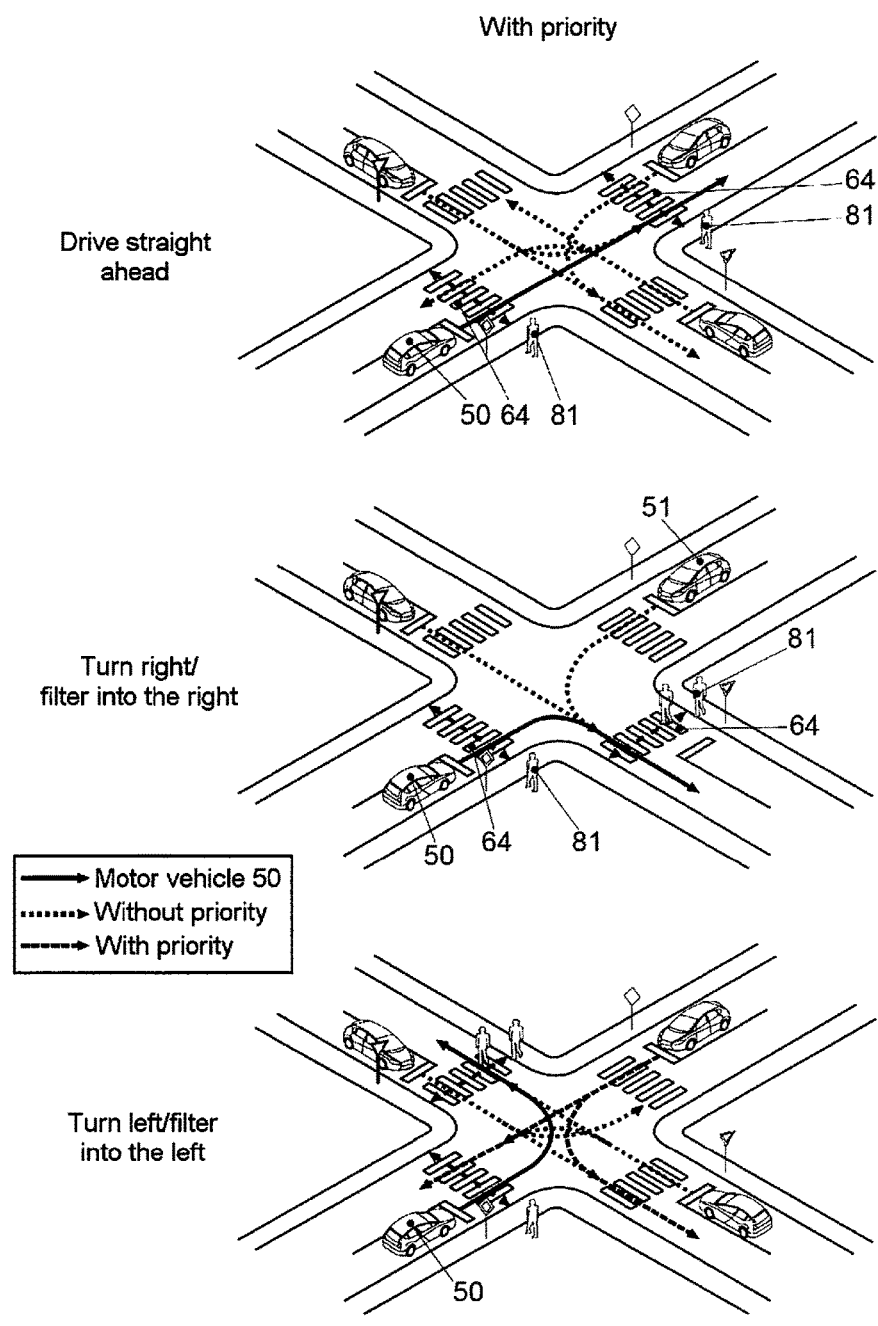
FIG. 3b shows a schematic illustration of a typical traffic situation at an X junction explaining different scenarios taking into account the priority rules which are based on the road signs, wherein the motor vehicle has priority.
Figure 3C:
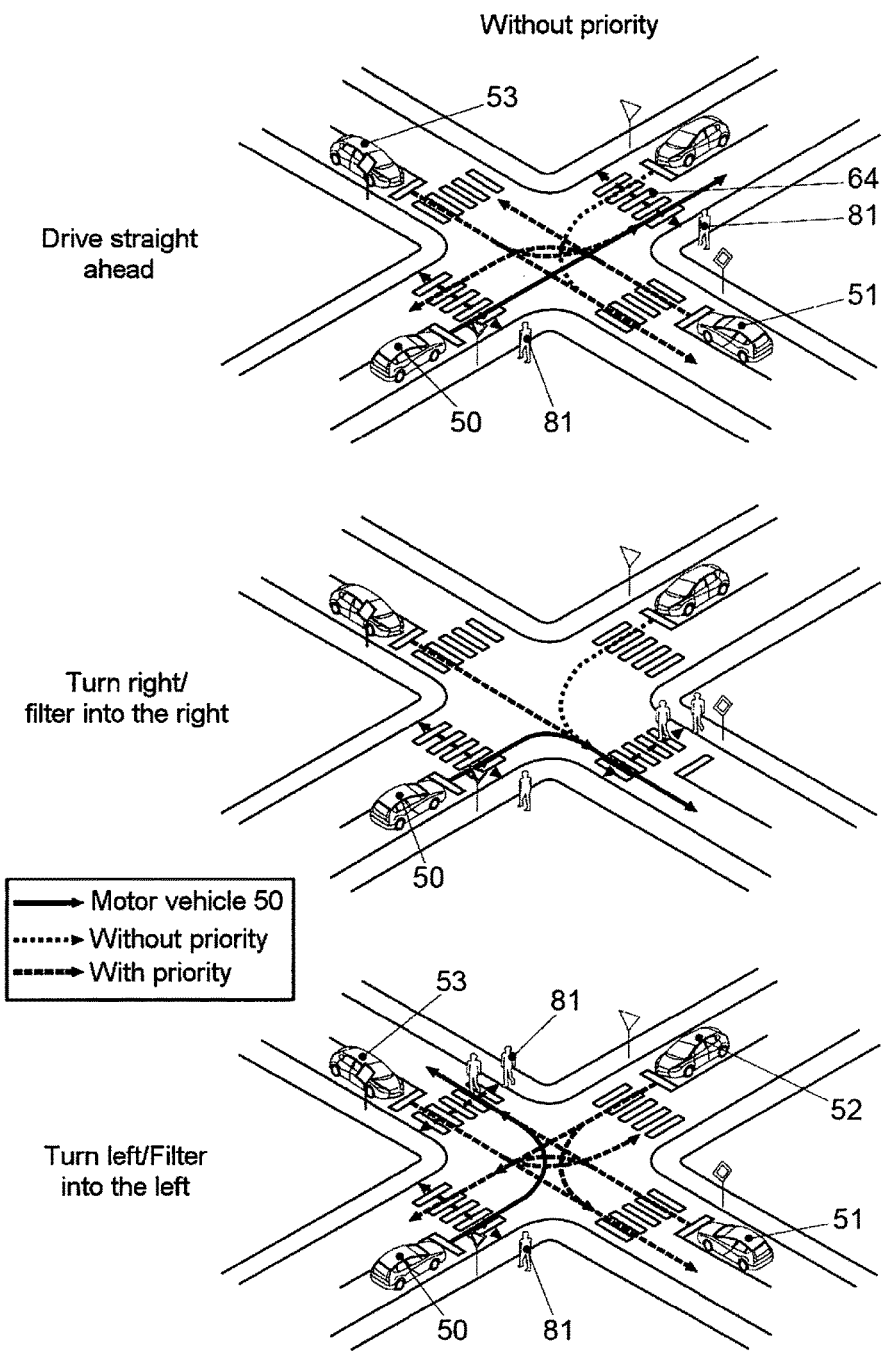
FIG. 3c shows a schematic illustration of a typical traffic situation at an X junction explaining different scenarios taking into account the priority rules based on road signs, wherein the motor vehicle does not have priority.

FIGS. 3b and 3c show the two scenarios in which the rights of way are regulated by means of road signs, both for the case in which the motor vehicle 50 has priority and for the case in which the motor vehicle 50 does not have priority. When it has priority, the motor vehicle 50 must, when driving straight ahead, merely wait for pedestrians 81 on the pedestrian crossing 64. When turning right, it is likewise necessary to wait only for the pedestrians 81 of the pedestrian crossings 64. In contrast, when turning left, it is necessary to wait additionally for an oncoming motor vehicle 51. In the scenarios without a right of way, it is necessary to wait for the pedestrians 81 and for other motor vehicles 51, 53 from the right and from the left. When turning left, it is necessary to wait for the pedestrians 81 and for other motor vehicles 51, 52, 53 from all the other directions.

Figure 3D:
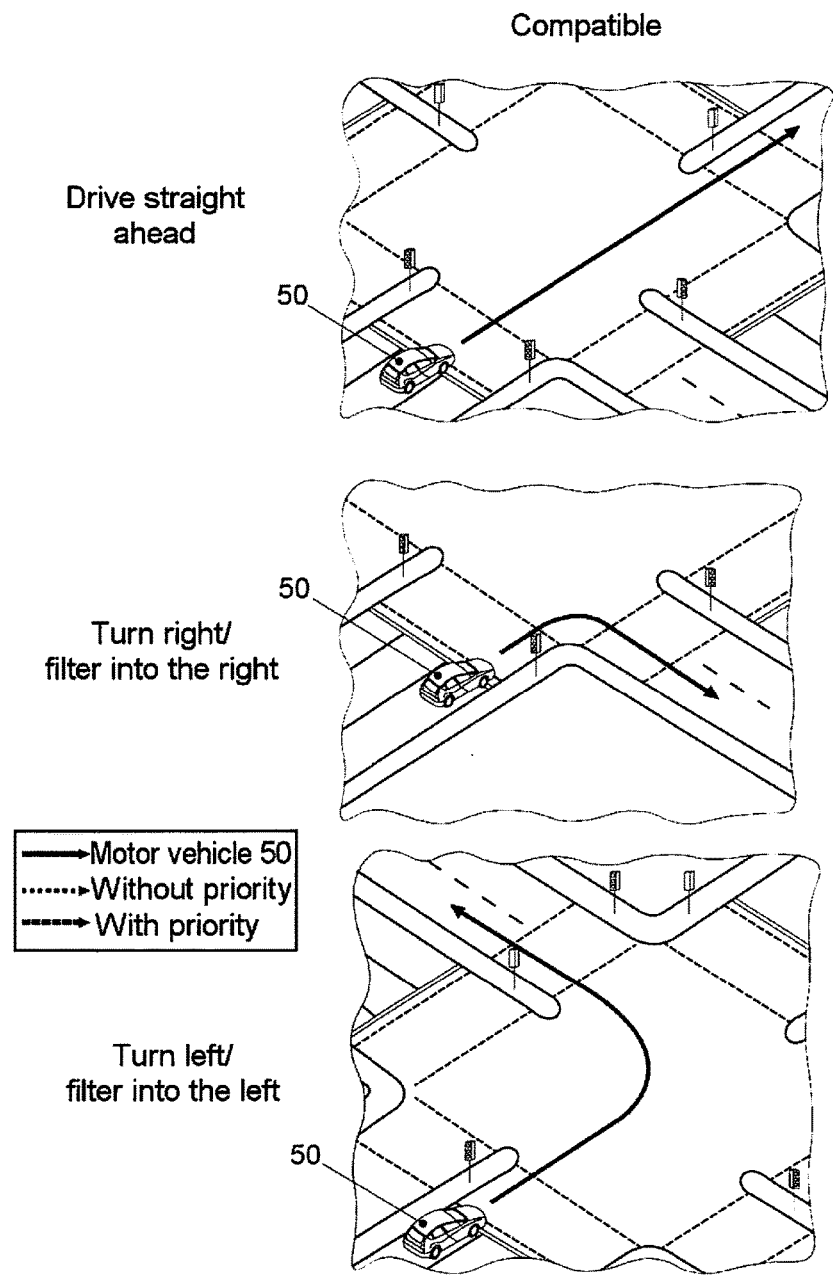
FIG. 3d shows a schematic illustration of a typical traffic situation at an X junction explaining different scenarios taking into account the priority regulated by a traffic light system, wherein compatible scenarios are considered.
Figure 3E:
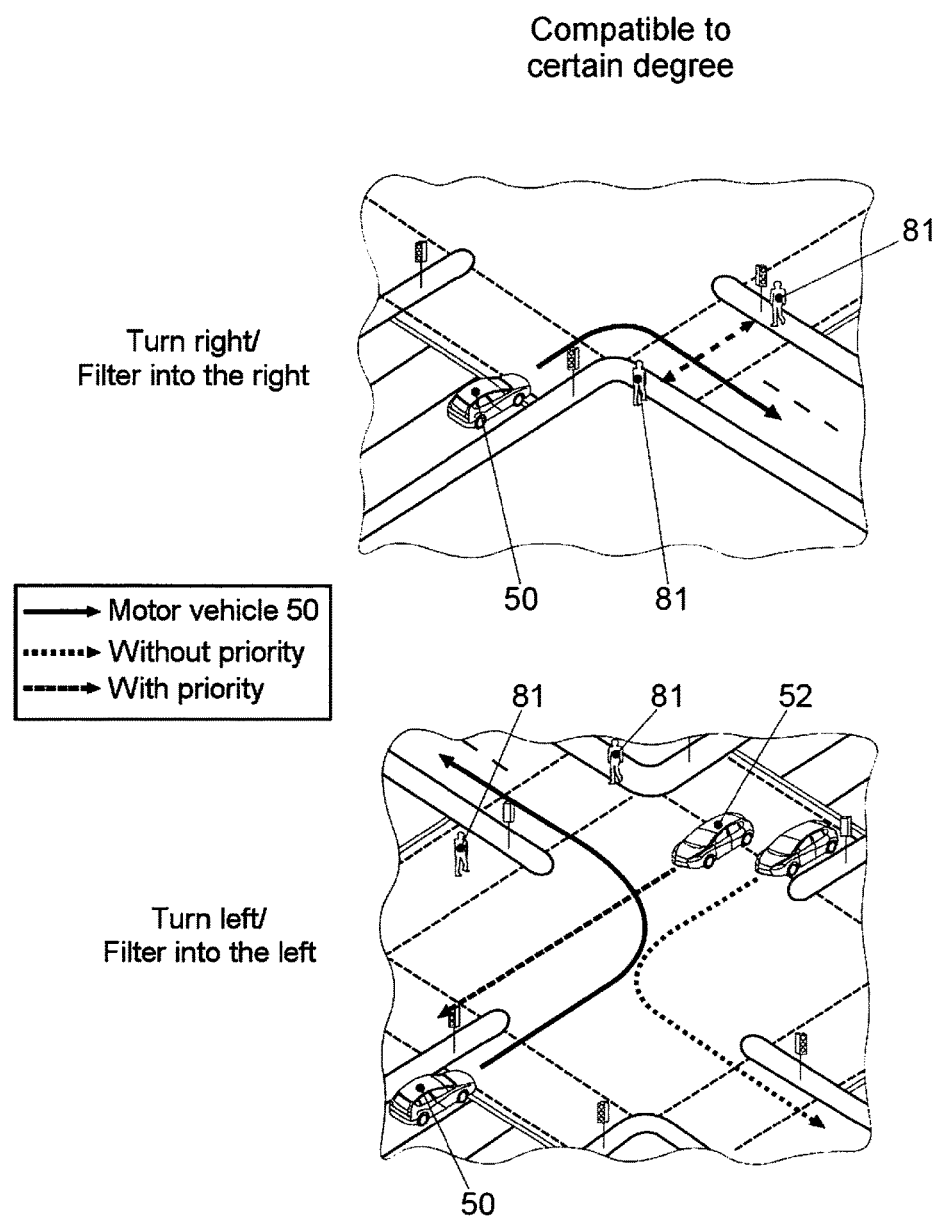
FIG. 3e shows a schematic illustration of a typical traffic situation at an X junction explaining different scenarios taking into account the priority regulated by a traffic light system, wherein scenarios which are compatible to a certain degree are considered.

FIGS. 3d and 3e show the scenarios for the case in which a traffic light system regulates the traffic. In this context, a differentiation is made between compatible scenarios and scenarios which are compatible to a certain degree. A compatible scenario does not have any conflict points. A scenario which is compatible to a certain degree has, on the other hand, at least one potential conflict point, for example, a point of intersection with a trajectory of a pedestrian (or cyclist) or with a trajectory of another motor vehicle. In this context, the priority rules which apply in the scenario decide whether a maneuver is compatible or compatible to a certain degree.

When driving straight ahead it is not necessary to wait for any other road user. When turning right, it is necessary to wait for the pedestrians 81 only in the situation which is compatible to a certain degree, while in the compatible situation there is no potential conflict point so that the motor vehicle 50 can simply turn. When turning left, in the compatible situation it is not necessary to wait for other road users, since the motor vehicle 50 has priority over all the other road users. In contrast, in the scenario which is compatible to a certain degree the motor vehicle 50 must wait for an oncoming motor vehicle 52 and for pedestrians 81.

Figure 4:
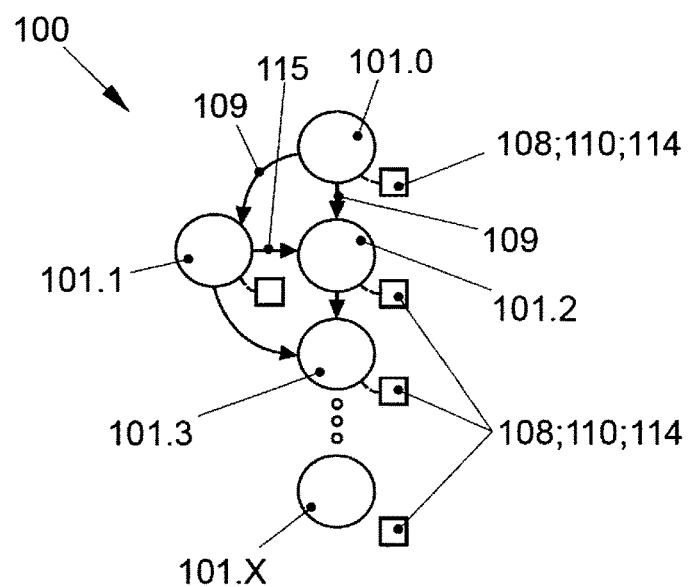
FIG. 4 shows a schematic illustration of the linking of a plurality of elementary situations within a scenario.

FIG. 4 shows a schematic illustration of a scenario 100 which has a plurality of elementary situations 101.0, 101.1, 101.2, 101.3, 101.X. The elementary situations 101.0, 101.1, 101.2, 101.3, 101.X are linked to one another in a chronologically successive state and each have as attributes 108 at least one monitoring region 110 and an enable criterion 114. Only if the respective enable criterion 114 is satisfied in a current elementary situation 101.0, 101.1, 101.2, 101.3, 101.X is there a changeover to the next elementary situation 101.1, 101.2, 101.3, 101.X. In this context it is possible that there is more than one potentially successive elementary situation 101.1, 101.2 for an elementary situation 101.0. Which of the potentially subsequent elementary situations 101.1, 101.2 follows the elementary situation 101.0 here results from the current environment or from detected environment data. If the elementary situation 101.0 describes, for example, a vehicle approaching a junction, the latter may be an X junction or a T junction. However, the environment data which is provided does not permit any clearly defined decision, with the result that only two hypotheses 109 can be postulated: the X junction then corresponds to the one potentially following elementary situation 101.1, and the T junction to the second potentially following elementary situation 101.2. If the motor vehicle then approaches the junction further, the provided environment data will generally become better, with the result that at some point a clearly defined decision can be made or a correction 115 of the previous hypothesis can be carried out. In this way, the currently present scenario is continuously checked and, if appropriate, corrected on the basis of currently provided environment data. As a result, a continuously up to date interpretation is possible.

Figure 5A:
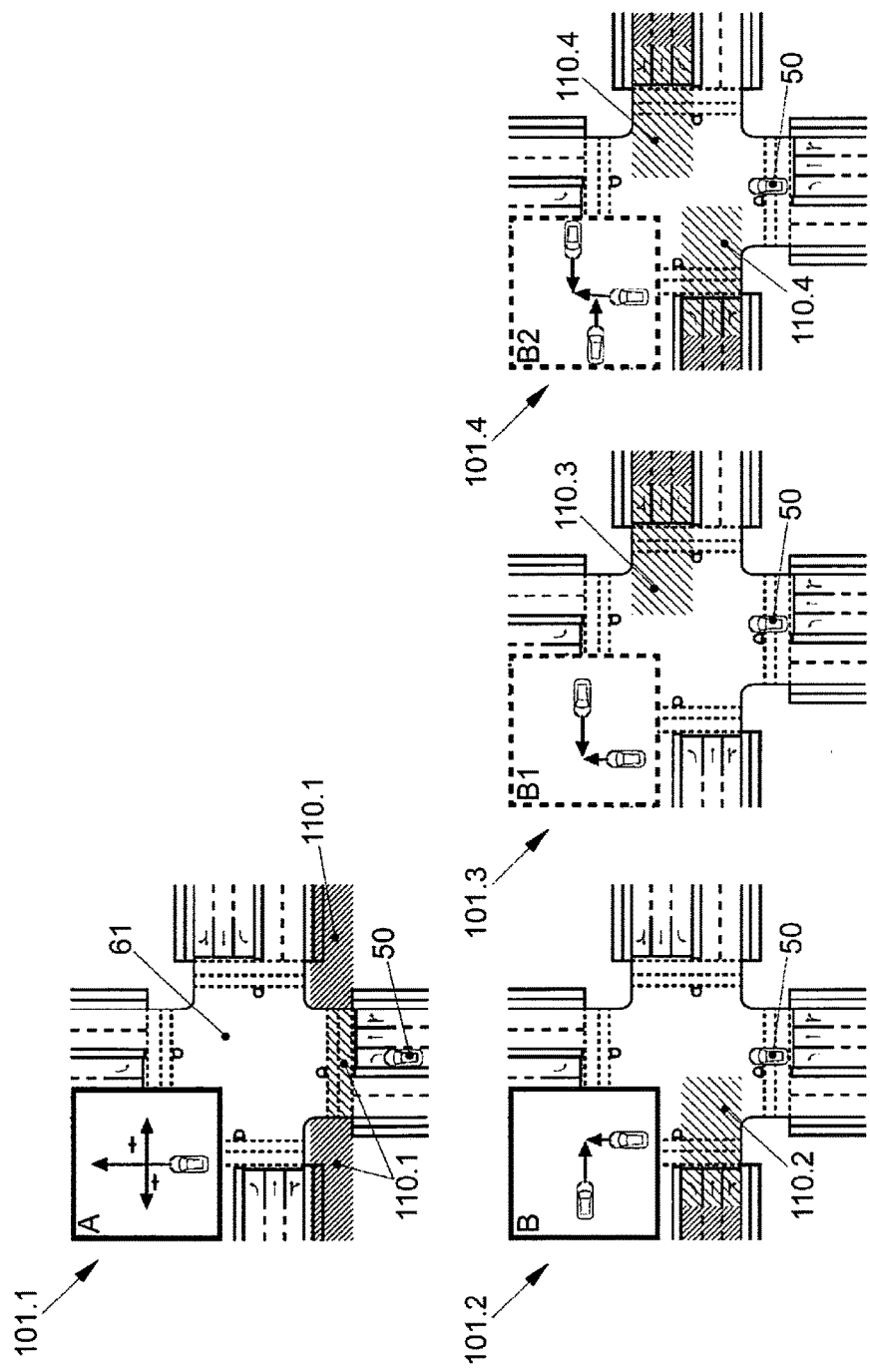
FIG. 5a shows a schematic illustration of an exemplary scenario of successive elementary situations when turning.
Figure 5B:
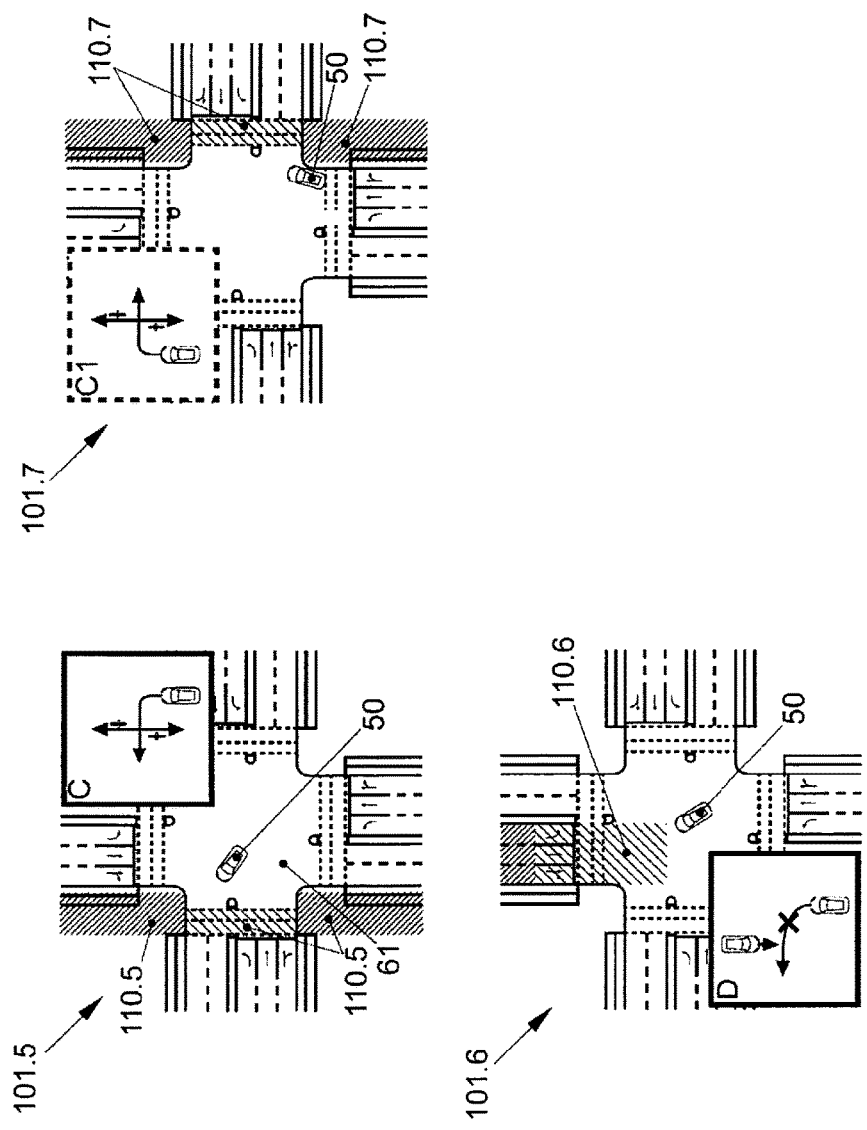
FIG. 5b shows a schematic illustration of further successive elementary situations of the exemplary scenario of turning (continuation of FIG. 5a)

FIGS. 5a and 5b show the elementary situations 101.1, 101.2, 101.2, 101.4, 101.5, 101.6, 101.7 of an exemplary scenario which describes the turning of a motor vehicle 50 from a three-lane road onto a two-lane road, wherein the rights of way are regulated according to road signs, and the motor vehicle 50 does not have the right of way. In the first elementary situation 101.1, the motor vehicle 50 changes to turning left onto the left-hand lane and approaches the junction 61. The scenario-interpretation apparatus recognizes that the motor vehicle 50 is approaching an X junction 61 and that a left-hand turn is planned. This elementary scenario 101.1 has, as an attribute, a monitoring region 110.1 which comprises the pedestrian crossing and the regions to the left and right on the pedestrian crossing for monitoring a potential conflict point. The motor vehicle 50 must wait for passing pedestrians (or cyclists) and only if pedestrians are no longer crossing the road, or no longer wish to cross the road, is the enable criterion assigned to the elementary situation 101.1 satisfied.

Compared to monitoring the complete junction 61, monitoring of merely the monitoring region 110.1 is beneficial since much less information has to be evaluated. To assess the enable criterion in an elementary situation, in each case it is necessary to monitoring only the associated monitoring regions. The scenario-interpretation apparatus interrogates from the environment-perception apparatus whether there are objects located within the monitoring region 110.1. In this context, future trajectories of the objects can be estimated on the basis of detected or estimated movement data, for example, by means of a prediction apparatus, and can then be made available to the scenario-interpretation apparatus.

The next elementary situation 101.2 follows the first elementary situation 101.1 and takes into account, as a potential conflict point, a motor vehicle coming from the left. Correspondingly, a monitoring region 110.2 on the intersecting lane to the left in front of the motor vehicle 50 and a corresponding enable criterion (no other motor vehicle from the left) are assigned as attributes to the elementary situation 101.2.

A further elementary situation 101.3 takes into account, as a potential conflict point, another motor vehicle coming from the right. Correspondingly, a monitoring region 110.3 on the intersecting lane to the right in front of the motor vehicle 50 and a corresponding enable criterion (no other motor vehicle from the right) are assigned as attributes to the elementary situation 101.3.

Another elementary situation 101.4 combines the two previous elementary situations 101.2, 101.3. A monitoring region 110.4 on the intersecting lane both to the right and to the left in front of the motor vehicle 50 and a corresponding enable criterion (no other motor vehicle from the left or right) are then assigned as attributes to this elementary situation 101.4.

In a following elementary situation 101.5 (FIG. 5*b*) the motor vehicle 50 is then already in the center of the junction 61. Here, the motor vehicle 50 must wait for pedestrians, and accordingly a monitoring region 110.5, which comprises the sidewalks to the right and left of the motor vehicle 50 and the pedestrian crossing, is assigned to the elementary situation 101.5. An associated enable criterion is that there is no longer any pedestrian located on the pedestrian crossing and there is no longer any pedestrian intending to cross the road. An elementary situation 101.7 corresponding to this results for the motor vehicle 50 in the case of right-hand turning. Here, a monitoring region 110.7 must also be monitored for relatively vulnerable road users who are crossing the road or wish to cross the road.

In the same position of the motor vehicle 50 on the junction, a further elementary situation 101.6 is, for example, that the motor vehicle 50 has to wait for an oncoming motor vehicle. The monitoring region 110.6 and the enable criterion are then correspondingly defined.

Figure 6B:
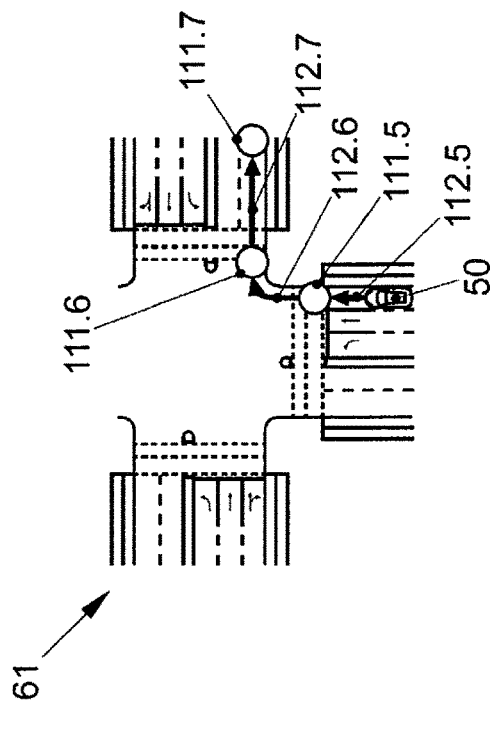
FIG. 6b shows a schematic illustration explaining destination points which are assigned to the individual elementary situations when turning right.
Figure 6A:
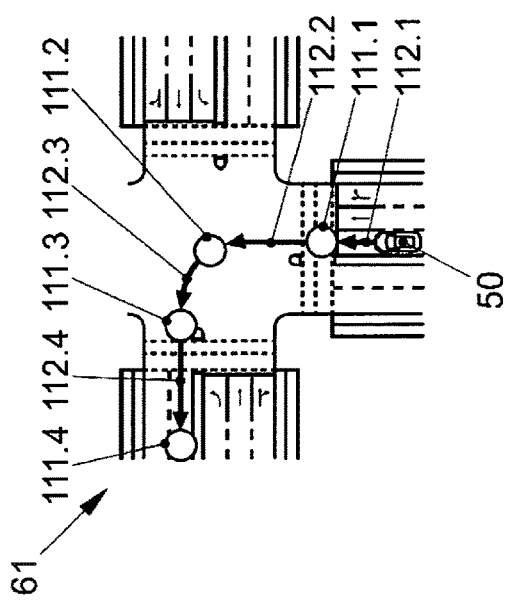
FIG. 6a shows a schematic illustration explaining destination points which are assigned to the individual elementary situations when turning left.

FIGS. 6*a* and 6*b* show by way of example destination points 111.1, 111.2, 111.3, 111.4 estimated by the scenario-interpretation apparatus, for left-hand turning or estimated destination points 111.5, 111.6, 111.7 for right-hand turning at a junction 61. In this context, a destination point 111.1, 111.2, 111.3, 111.4, 111.5, 111.6, 111.7 is estimated for each of the elementary situations (see in this respect FIGS. 5*a* and 5*b*). In principle, it is also possible here that the same destination point 111.1, 111.2, 111.3, 111.4, 111.5, 111.6, 111.7 is assigned to a plurality of elementary situations. Every time that the at least one enable criterion of a current elementary situation is satisfied, the motor vehicle 50 is driven in an automated state to that destination point 111.1, 111.2, 111.3, 111.4, 111.5, 111.6, 111.7 which is assigned to the elementary situation. A maneuver-planning apparatus assumes here the planning of the specific trajectory 112.1, 112.2, 112.3, 112.4, 112.5, 112.6, 112.7 from one destination point 111.1, 111.2, 111.3, 111.4, 111.5, 111.6, 111.7 to the next, and a controller carries out the automated driving along the planned trajectory 112.1, 112.2, 112.3, 112.4, 112.5, 112.6, 112.7 by controlling at least one actuator system of the motor vehicle 50.

Figure 7A:
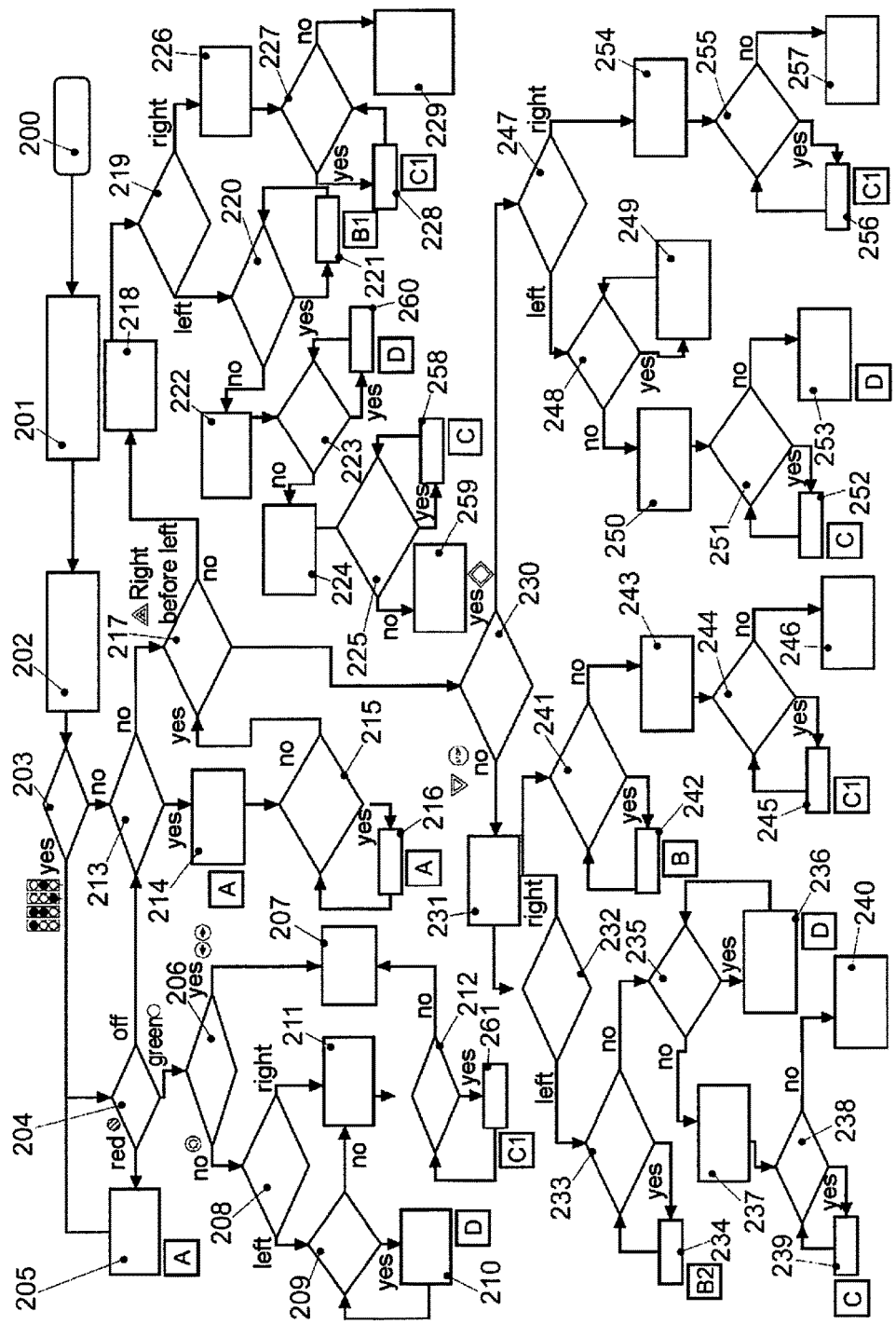
FIG. 7a shows a schematic flowchart explaining a turning maneuver, wherein the turning maneuver is based on elementary situations.
Figure 7B:
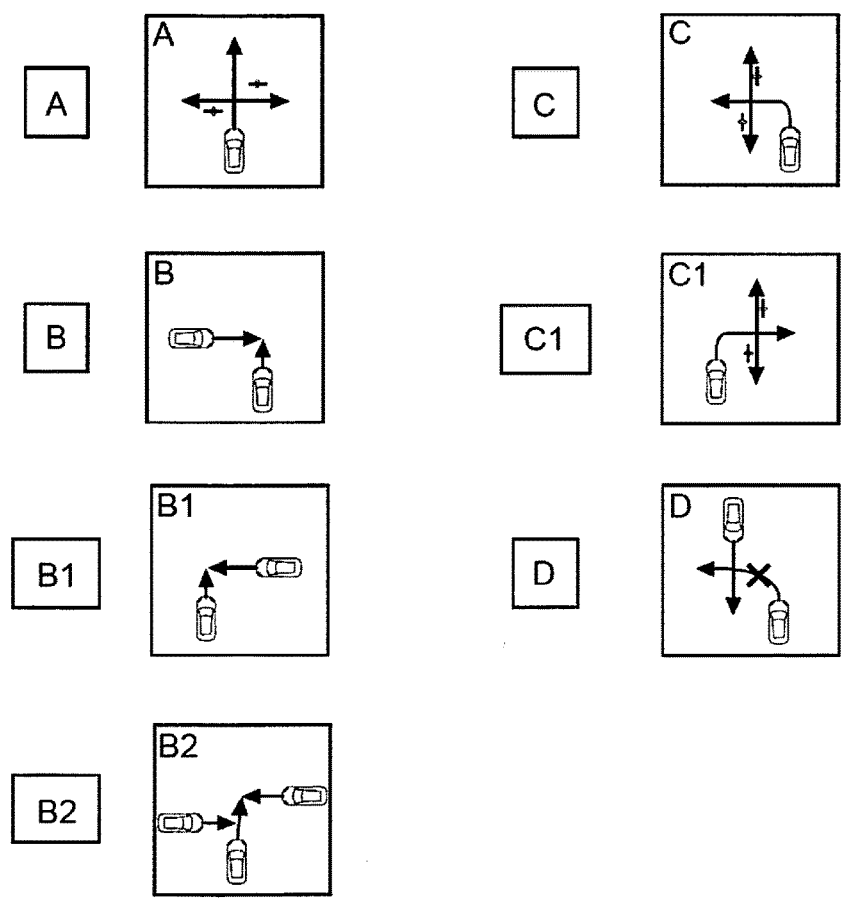

FIG. 7*a* shows a schematic flowchart explaining the "turning" maneuver at a junction, wherein the maneuver is based on elementary situations. The flowchart comprises here a plurality of scenarios which are adapted dynamically as a function of the environment. In this context, in each case parts of the flowchart correspond to the elementary situations which have been described in FIGS. 5*a* and 5*b*. The elementary situations are illustrated for better clarity as a key in FIG. 7*b*, wherein the same designations have been used as in FIGS. 5*a* and 5*b*. In addition, the destination points defined in FIGS. 6*a* and 6*b* are used.

In the initial situation 200, the motor vehicle is approaching a junction. It changes 201 onto a suitable lane to prepare a corresponding maneuver for turning left or turning right. When it has changed lane, it moves closer 202 still to the junction. In a first interrogation 203, the scenario-interpretation apparatus enquires from the environment-perception apparatus whether a traffic light system is present.

If this is the case, it is interrogated 204 which traffic light phase is present. Here, three possibilities (red, green, switched off) arise. If the traffic light is switched to "red", the motor vehicle must wait. The motor vehicle is then automatically driven 205 to a first destination point, estimated by the scenario-interpretation apparatus (destination points 111.1, 111.5 in FIG. 6*a* or FIG. 6*b*) before the junction. When it has arrived at the first destination point, the interrogation 204 of the traffic light phase is repeated. If the traffic light phase is "green", in an interrogation 206 it is checked whether the flow of traffic is compatible or not (or compatible to a certain degree). If the flow of traffic is compatible, the vehicle can turn 207 completely (to the left or to the right), since the motor vehicle has priority. The scenario is then ended. In contrast, if the flow of traffic is compatible only to a certain degree, that is to say the motor vehicle must observe priority rules despite the green traffic light phase, in an interrogation 208 it is first clarified whether the maneuver which is to be carried out provides the left-hand turning or right-hand turning. If the vehicle is to turn to the left, in a following interrogation 209 it is checked whether traffic is coming from the opposite direction. If this is the case, the motor vehicle is driven 210 in an automated state to the second destination point (destination point 111.2 in FIG. 6*a*) estimated by the scenario-interpretation apparatus. At the destination point 111.2 the interrogation 209 is repeated. If there is no traffic coming from the opposite direction, the motor vehicle is driven 211 as far as the third estimated destination point (destination point 111.3 in FIG.

6a) in an automated state. At the destination point 111.3 an interrogation 212 takes place to determine whether relatively vulnerable road users (pedestrians, cyclists, etc.) are crossing or wish to cross the road into which the vehicle is turning. If this is the case, the vehicle is stopped 261 and the interrogation 212 is repeated. If no relatively vulnerable road users are present, the vehicle is turned completely (corresponds to destination point 111.4 in FIG. 6a). If the maneuver of the motor vehicle is right-hand turning, the interrogation 208 yields a corresponding result. Then, in the next operation at 211 the vehicle is driven as far as the sixth destination point (destination point 111.6 in FIG. 6b). There, the interrogation 212 is correspondingly carried out. If no relatively vulnerable road users are present, the vehicle is turned completely 207 (corresponds to the destination point 111.7 in FIG. 6b).

If the interrogation 204 reveals that the traffic light is switched off, this corresponds to the case in which the interrogation 203 reveals that there is no traffic light present. Then, in an interrogation 213 it is checked whether a pedestrian crossing is located in front of the motor vehicle. If a pedestrian crossing is present, then the motor vehicle is driven 214 in an automated state as far as the next estimated destination point. Here, if appropriate the motor vehicle waits, and it is checked in an interrogation 215 whether there are relatively vulnerable road users who are crossing or wish to cross the pedestrian crossing. There is a waiting period 216 and the interrogation 215 is repeated. If no relatively vulnerable road users are present (any longer) or if there is no pedestrian crossing present, in an interrogation 217 it is checked whether there are road signs which regulate the priority.

If the interrogation 217 reveals that there are no road signs present, the "right before left" rule is assumed. The estimation of the first destination point is then repeated by the scenario-interpretation apparatus, with the result that the first destination point is shifted 218 further to the rear. Subsequently, in an interrogation 219 it is detected whether the vehicle is to turn to the left or to the right. If it is to turn to the left, in an interrogation 220 it is checked whether other road users are coming from the right. If this is the case, the vehicle is stopped 221 and the interrogation 220 is repeated. If no other road users are coming (any longer) from the right, the vehicle is driven 222 to the second destination point (destination point 111.2 in FIG. 6a) in an automated state. At the destination point 111.2 it is checked in an interrogation 223 whether traffic is coming from the opposite direction. If this is the case, the vehicle is stopped 260 and the interrogation 223 is repeated. If no traffic is coming from the opposite direction (any longer), the motor vehicle is driven 224 in an automated state as far as the third estimated destination point (destination point 111.3 in FIG. 6a). There, it is checked in an interrogation 225 whether relatively vulnerable road users are crossing or wish to cross the road into which the vehicle is to turn. If relatively vulnerable road users are present, the vehicle is stopped 258 and the interrogation 225 is repeated. If no relatively vulnerable road users are present (any longer), the motor vehicle is driven 259 in an automated state as far as the fourth estimated destination point (destination point 111.4 in FIG. 6a).

If the interrogation 219 reveals that the vehicle is to turn to the right, the scenario is simplified. The vehicle is then driven 226 as far as the sixth estimated destination point (destination point 111.6 in FIG. 6b). There, in an interrogation 227 it is checked whether relatively vulnerable road users are crossing or wish to cross the road into which the vehicle is to turn. If relatively vulnerable road users are present, the vehicle is stopped 228 and the interrogation 227 is repeated. If no relatively vulnerable road users are present (any longer), the vehicle is driven 229 in an automated state as far as the seventh estimated destination point (destination point 111.7 in FIG. 6b).

In contrast, if the interrogation 217 reveals that road signs are present, in a following interrogation 230 it is determined whether the motor vehicle has priority or not. If it does not have priority, the last estimated destination point is estimated again by the scenario-interpretation apparatus and as a result shifted 231 (e.g., further to the rear in the direction of the junction). Subsequently, in an interrogation 232 it is determined whether the vehicle is to turn to the left or turn to the right. If it is to turn to the left, it is determined in a following interrogation 233 whether there is traffic from the left or from the right. If this is the case, the vehicle is stopped 234 and the interrogation 233 is repeated. If this is not the case, in an interrogation 235 it is checked whether traffic is present from the opposite direction. If oncoming traffic is present, the motor vehicle is driven 236 in an automated state as far as the second estimated destination point (destination point 111.2 in FIG. 6a) and the interrogation 235 is repeated. If no oncoming traffic is present (any longer), the vehicle is driven 237 as far as the third estimated destination point (destination point 111.3 in FIG. 6a). In an interrogation 238 it is then checked whether relatively vulnerable road users are present who are crossing or wish to cross the road into which the vehicle is to turn. If relatively vulnerable road users are present, the vehicle is stopped 239 and the interrogation 238 is repeated. If no relatively vulnerable road users are present (any longer), the vehicle is driven 240 as far as the fourth estimated destination point (destination point 111.4 in FIG. 6a).

In contrast, if the interrogation 232 reveals that the vehicle is to turn to the right, in an interrogation 241 it is checked whether traffic is present from the left or from the right. If cross traffic is present, the vehicle is stopped 242 and the interrogation 241 is repeated. If no cross traffic is present (any longer), the vehicle is driven 243 as far as the sixth estimated destination point (destination point 111.6 in FIG. 6b). Here, it is checked in an interrogation 244 whether relatively vulnerable road users are present who are crossing the road or wish to cross the road into which the vehicle is to turn. If relatively vulnerable road users are present, the vehicle is stopped 245 and the interrogation 244 is repeated. If no relatively vulnerable road users are present (any longer), the vehicle is driven 246 as far as the seventh estimated destination point (destination point 111.7 in FIG. 6b).

If the interrogation 230 reveals that the motor vehicle has priority, in a following interrogation 247 it is determined whether the vehicle is to turn to the left or to the right. If it is to turn to the left, it is subsequently checked in an interrogation 248 whether traffic from the opposite direction is present. If oncoming traffic is present, the motor vehicle is driven 249 in an automated state as far as the second estimated destination point (destination point 111.2 in FIG. 6a) and the interrogation 248 is repeated. If no oncoming traffic is present (any longer), the motor vehicle is driven 250 in an automated state as far as the third estimated destination point (destination point 111.3 in FIG. 6a). There, in an interrogation 251 it is checked whether relatively vulnerable road users are present who are crossing or wish to cross the road into which the vehicle is to turn. If relatively vulnerable road users are present, the vehicle is stopped 252 and the interrogation 251 is repeated. If no relatively vulnerable road users are present (any longer), the vehicle is driven 253 as far as the fourth estimated destination point (destination point 111.4 in FIG. 6*a*).

If the interrogation 247 reveals that the vehicle is to turn to the right, the motor vehicle is driven 254 in an automated state as far as the sixth estimated destination point (destination point 111.6 in FIG. 6*b*).

There, in an interrogation 255 it is checked whether relatively vulnerable road users are present who are crossing or wish to cross the road into which the vehicle is to turn. If relatively vulnerable road users are present, then the vehicle is stopped 256 and the interrogation 255 is repeated. If no relatively vulnerable road users are present (any longer), the vehicle is driven 257 as far as the seventh estimated destination point (destination point 111.7 in FIG. 6*b*).

When the respective last destination point (destination point 111.4 in FIG. 6*a* or destination point 111.7 in FIG. 6*b*) is reached, the respective scenario is run through completely and therefore ended.

Figure 8:
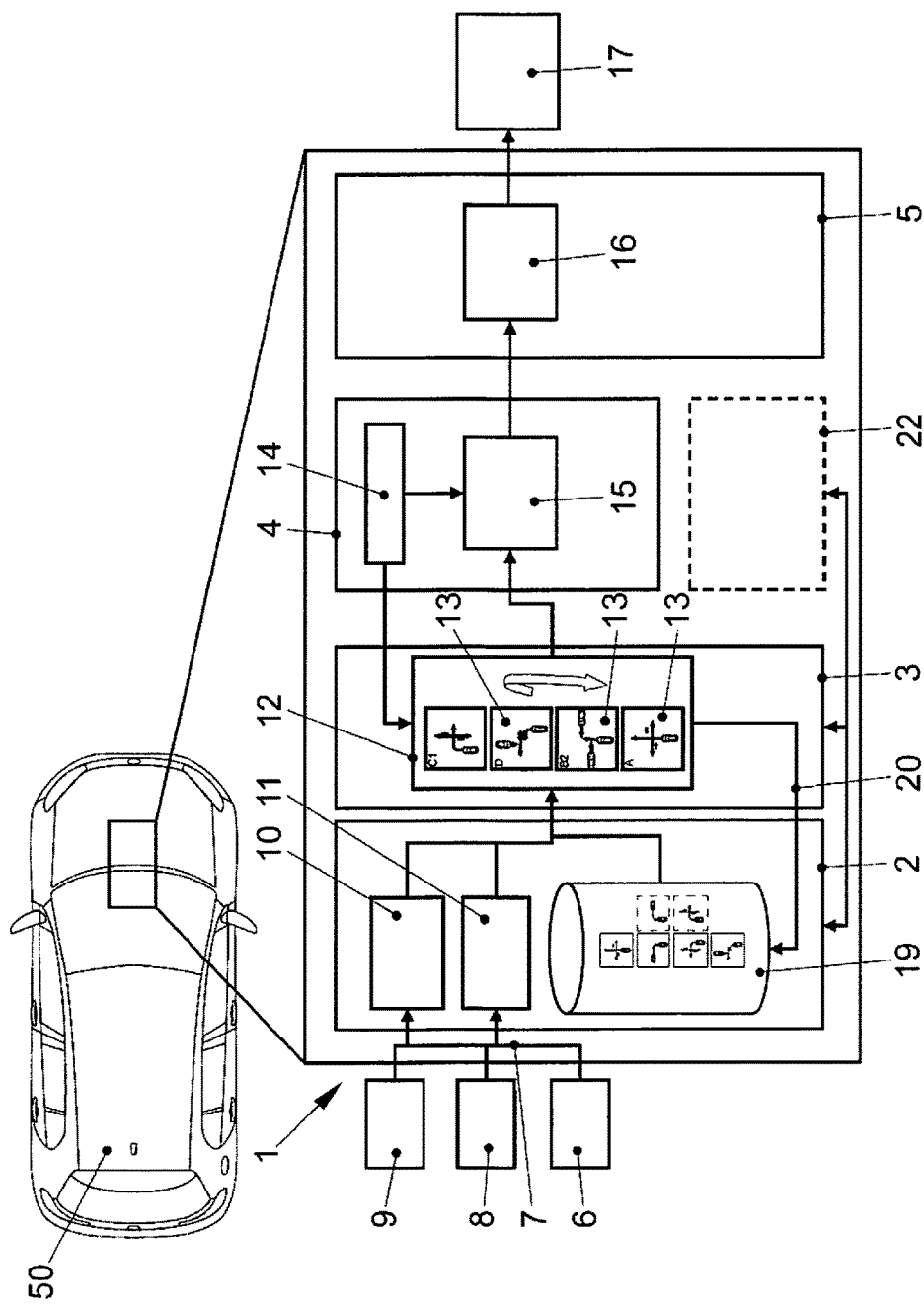
FIG. 8 shows a schematic illustration of a device for automated driving.

FIG. 8 shows a schematic illustration of a device 1 for the automated driving of a motor vehicle 50. The device 1 comprises an environment-perception apparatus 2, a scenario-interpretation apparatus 3, a maneuver-planning apparatus 4 and a controller 5.

An environment of the motor vehicle 50 is detected using a sensor system 6 and provided as environment data 7. Such a sensor system 6 can be, for example, a camera, a radar sensor, an ultrasonic sensor or the like. In addition, environment data 7 can also be provided via a communication interface 8, for example, a Car2X interface and/or a map 9 of the environment. The environment data 7 is evaluated by the environment-perception apparatus 2 and objects are detected in the environment of the motor vehicle. This can take place, for example, by means of an underlying-surface-detection apparatus 10 and/or an object-detection apparatus 11. The environment data 7 which relates to the underlying surface is merged in the underlying-surface-detection apparatus 10. In the object-detection apparatus 11, there is correspondingly a fusion of the environment data 7 which describes objects in the environment of the motor vehicle 50. Detected objects can be, for example, other motor vehicles, relatively vulnerable road users (pedestrians, cyclists, etc.), or else road signs. The data relating to the detected objects is passed on from the environment-perception apparatus 2 to the scenario-interpretation apparatus 3. The latter evaluates the data and selects, on the basis of the evaluated data, a scenario 12 from a set of provided scenarios. A scenario can be, for example, turning to the left or turning to the right (as illustrated, e.g., in FIGS. 5*a*, 5*b* or FIG. 7). The selected scenario 12 forms a hypothesis about the current traffic situation. It is possible at any time that the scenario-interpretation apparatus 3 will reject the current scenario 12 and select another scenario or a modified scenario if such a scenario is more probable on the basis of new data of the environment-perception apparatus 2. Therefore, when the vehicle approaches a junction it is possible, for example, firstly to assume a scenario for a T junction, but then to replace this scenario with an X junction because new (better) data has been provided by the environment-perception apparatus 2 in the meantime.

A current scenario 12 comprises here at least one elementary situation 13 which corresponds to an intermediate chronological operation in the current scenario 12. The elementary situations 13 are connected to one another in a chronologically successive state. In this context, there is a changeover to the respective next elementary situation 13 if at least one enable criterion which is assigned as an attribute to the elementary situation 13 is satisfied. To check the at least one enable criterion, each elementary situation 13 is assigned a monitoring region as a further attribute. The monitoring region is interrogated by the scenario-interpretation apparatus 3 by an enquiry 20 at the environment-perception apparatus 2. In this context, the attributes for the current elementary situation 13 are transferred to the environment-perception apparatus 2, which, itself, can also detect the elementary situations 13 by means of a system-detection apparatus 19. By assigning specific attributes such as, for example, specific objects (traffic light, road sign, . . . ) the specific objects can be interrogated selectively at the environment-perception apparatus.

For each of the elementary situations 13, the scenario-interpretation apparatus 3 then estimates a destination point. The destination point is transferred to the maneuver-planning apparatus 4. The maneuver-planning apparatus 4 comprises a mission planner 14 which plans the route (e.g., which roads are to be driven along during the automated journey from the starting point as far as the destination) of the motor vehicle. In addition, the maneuver-planning apparatus 4 also plans, by means of a trajectory-planning apparatus 15, the specific trajectories between the individual destination points estimated by the scenario-interpretation apparatus 3. The specifically planned trajectories are transferred to the controller 5 by the maneuver-planning apparatus 4. The controller 5 then comprises, for example, a regulating apparatus 16, which performs closed-loop or open-loop control of at least one actuator system 17 of the motor vehicle 50, with the result that the motor vehicle 50 drives along the specific trajectory in an automated state.

The device 1 can optionally comprise a prediction apparatus 22 which predicts future trajectories of detected objects within the at least one monitoring region of an elementary situation. It is possible to include here, for example, also map data, a traffic regulation as well as movement data, e.g., a position, an orientation, a use of a flashing indicator light, of the detected objects. To estimate the trajectories, for example, the following approaches can be used: mixtures of Gaussian, Kalman filters, Monte-Carlo simulations, Gaussian process, logistic regression, relevance vector machines, support vector, hidden Markov models and Bayes networks.

The device or parts thereof can also be embodied as a combination of hardware and software, for example, a microcontroller or microprocessor on which a corresponding computer program is executed.

A schematic sequence of the elementary situations in a scenario for turning left, as is carried out by the scenario-interpretation apparatus, is illustrated in FIGS. 9*a* to 9*d*.

Figure 9B:
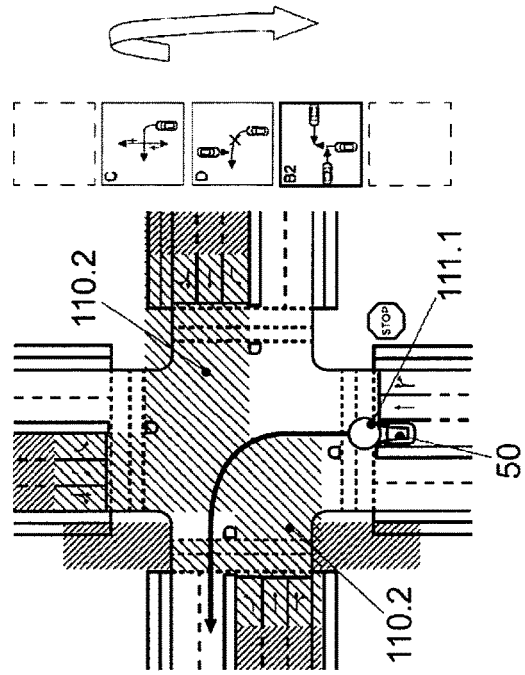
FIG. 9b shows a schematic illustration of the traffic situation explaining a subsequent elementary situation.
Figure 9A:
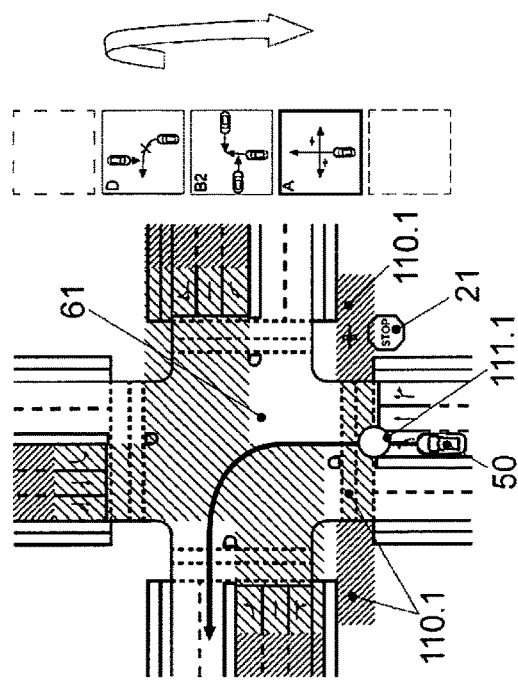
FIG. 9a shows a schematic illustration of a traffic situation explaining an elementary situation.

FIG. 9*a* provides a mission planner with information about suitable lanes, and the motor vehicle 50 carries out a lane change onto a suitable lane. The motor vehicle 50 subsequently approaches the junction 61. The scenario-interpretation apparatus detects a left-hand turning maneuver on the basis of data of the environment-perception apparatus and selects the corresponding scenario. Subsequently, the scenario-interpretation apparatus interrogates from the environment-perception apparatus whether a traffic light is present. If no traffic light is present, the scenario-interpretation apparatus additionally requires information about the applicable priority regulation (left before right or road signs etc.). In this example, the environment-perception apparatus detects a STOP sign 21, with the result that a scenario with a corresponding basic sequence of elementary situations is selected (see in this respect also the sequence in FIG. 7). Here, the following elementary situations respectively form hypotheses about the future profile of the scenario. The hypotheses can then be confirmed or contradicted by means of the environment-perception apparatus.

The first elementary situation (FIG. 9a) requests from the environment-perception apparatus the information as to whether relatively vulnerable road users (pedestrians or cyclists) are present in the monitoring region 110.1 which is assigned to the first elementary situation. Depending on whether relatively vulnerable road users are present or not, the scenario-interpretation apparatus estimates a first destination point 111.1. Since the scenario-interpretation apparatus already knows in advance where monitoring regions 110.2 of the next elementary situation (FIG. 9b) are located, information about vehicles which are coming from the left and the right are interrogated from the environment-perception apparatus.

The scenario-interpretation apparatus does not change the destination point 111.1 as long as pedestrians or cyclists are still crossing or still wish to cross the road. Otherwise, the destination point 111.1 is shifted forward (to a position in front of a potential conflict point with a motor vehicle coming from the left). Information about the monitoring region 110.2 continues to be interrogated from the environment-perception apparatus.

In the next elementary situation (FIG. 9c), oncoming motor vehicles are taken into account. Correspondingly, the monitoring region 110.3 is selected for this elementary situation. If no cross traffic is present, the next destination point 111.2 is estimated by the scenario-interpretation apparatus. The estimated destination point 111.2 is located before a possible conflict point with an oncoming motor vehicle here. The motor vehicle 50 is then driven in an automated state to the destination point 111.2.

Figure 9D:
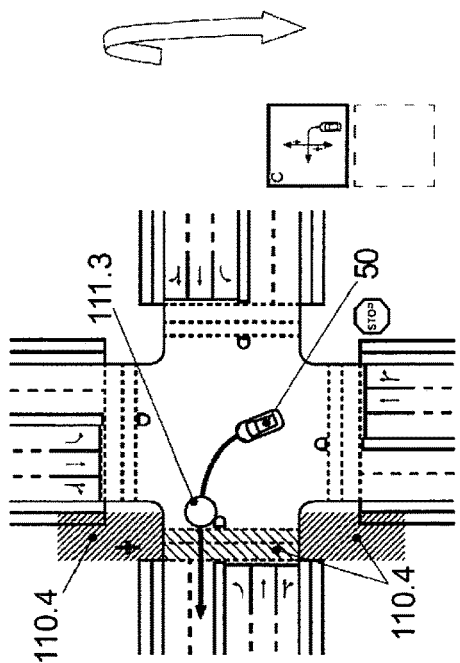
FIG. 9d shows a schematic illustration of the traffic situation explaining a subsequent elementary situation.
Figure 9C:
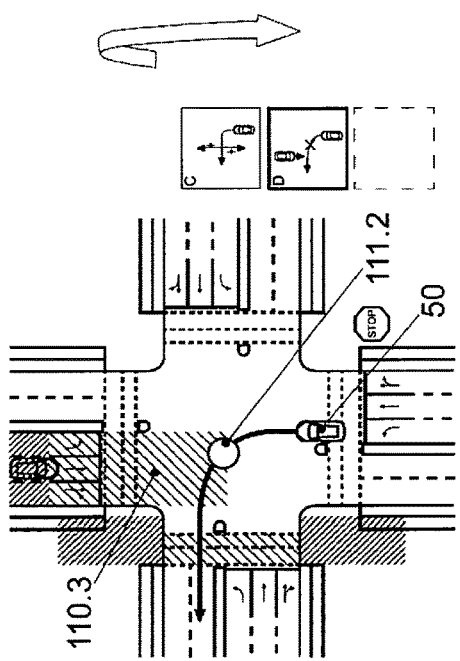
FIG. 9c shows a schematic illustration of the traffic situation explaining a subsequent elementary situation.

If there is no oncoming traffic present, the system proceeds to the next elementary situation (FIG. 9d). For this purpose, a destination point 111.3 is estimated and is driven to by the motor vehicle 50 in an automated state. In this elementary situation, the motor vehicle 50 must wait for relatively vulnerable road users who are crossing or wish to cross the road into which the vehicle is to turn. The monitoring region 110.4 is defined correspondingly. If no relatively vulnerable road users are present (any longer), the scenario is ended by completing the turning procedure.

REFERENCE NUMBERS

1 Device
2 Environment-perception apparatus
3 Scenario-interpretation apparatus
4 Maneuver-planning apparatus
5 Controller
6 Sensor system
7 Environment data
8 Communication interface
9 Map of environment
10 Underlying-surface-detection apparatus
11 Object-detection apparatus
12 Scenario
13 Elementary situation
14 Mission planner
15 Trajectory-planning apparatus
16 Regulating apparatus
17 Actuator system
21 STOP sign
22 Prediction apparatus
50 Motor vehicle
51 Further motor vehicle
52 Further motor vehicle
53 Further motor vehicle
60 Traffic situation
61 Junction
62.1 Road
62.2 Road
63 Lane
64.1 Pedestrian crossing
64.2 Pedestrian crossing
65 "Give way" sign
66 Priority sign
71 Conflict point
72 Conflict point
73 Conflict point
74 Conflict point
75 Conflict point
81 Pedestrian
82 Pedestrian
83 Pedestrian
90 Trajectory
91 Trajectory
92 Trajectory
93 Trajectory
100 Scenario
101 Elementary situation
101.0 Elementary situation
101.1 Elementary situation
101.2 Elementary situation
101.3 Elementary situation
101.4 Elementary situation
101.5 Elementary situation
101.6 Elementary situation
101.7 Elementary situation
101.X Elementary situation
102 Scene
103 State of the motor vehicle
104 Scenery
105 Dynamic elements
106 Action of driver
107 Automated action
108 Attribute
109 Hypothesis
110 Monitoring region
110.1 Monitoring region
110.2 Monitoring region
110.3 Monitoring region
110.4 Monitoring region
110.5 Monitoring region
110.6 Monitoring region
110.7 Monitoring region
111.1 Destination point
111.2 Destination point
111.3 Destination point
111.4 Destination point
111.5 Destination point
111.6 Destination point
111.7 Destination point
112.1 Trajectory
112.2 Trajectory
112.3 Trajectory
112.4 Trajectory
112.5 Trajectory
112.6 Trajectory
112.7 Trajectory
113 Object
114 Enable criterion
115 Correction
200-261 Interrogations and actions in a scenario

The invention claimed is:

1. A method for the automated driving of a motor vehicle, the method comprising:
provided environment data;
detecting objects in the environment data by an environment-perception apparatus;
selecting a current scenario from a provided set of known scenarios by a scenario-interpretation apparatus based on the detected objects, wherein a scenario has at least one elementary situation assigned at least one monitoring region and an enable criterion as attributes;
estimating a destination point for a current elementary situation by the scenario-interpretation apparatus;
planning a trajectory to the destination point by a maneuver-planning apparatus;
interrogating information about a monitoring region, associated with the elementary situation, from the environment-perception apparatus by the scenario-interpretation apparatus;
checking for the presence of the at least one enable criterion, associated with the elementary situation, based on the interrogated information by the scenario-interpretation apparatus; and
in response to the at least one enable criterion being satisfied, performing automated driving along the trajectory as far as the destination point by controlling at least one actuator system of the motor vehicle by a controller.

2. The method of claim 1, wherein the scenario-interpretation apparatus continuously checks whether the selected current scenario is still present, or there is a need for a change in the current scenario.

3. The method of claim 1, wherein at least one elementary situation has a further attribute that is a specific object whose presence is interrogated from the environment-perception apparatus by the scenario-interpretation apparatus.

4. The method of claim 1, wherein the estimation of the destination point is dynamically adapted by the scenario-interpretation apparatus based on the information interrogated from the environment-perception apparatus.

5. A device for the automated driving of a motor vehicle, the device comprising:
an environment-perception apparatus for detecting objects in provided environment data;
a scenario-interpretation apparatus for selecting a current scenario from a provided set of known scenarios based on the detected objects, wherein a scenario has at least one elementary situation assigned at least one monitoring region and an enable criterion as attributes;
a maneuver-planning apparatus; and
a controller,
wherein the scenario-interpretation apparatus estimates a destination point for a current elementary situation to interrogate information about the monitoring region, associated with the elementary situation, of the environment-perception apparatus, and checks for the presence of the at least one enable criterion of the current elementary situation based on the interrogated information, and
wherein the controller drives the motor vehicle, insofar as the at least one enable criterion is satisfied, along a trajectory, planned by the maneuver-planning apparatus, as far as the destination point in an automated state by controlling at least one actuator system of the motor vehicle, and the scenario-interpretation apparatus processes, after the reaching of the destination point, a subsequent elementary situation of the current scenario.

6. The device of claim 5, further comprising at least one sensor system which detects the environment of the motor vehicle and provides the environment data.

7. The device of 5, wherein the device has a memory, and the environment data is alternatively or additionally provided as a stored map of the environment.

8. The device of claim 5, wherein the device has a communication interface, and the environment data is alternatively or additionally made available via the communications interface.

9. The device of claim 5, further comprising a prediction apparatus, wherein the prediction apparatus predicts future trajectories of detected objects within the at least one monitoring region of an elementary situation.

10. The device of claim 9, wherein an enable criterion is that a trajectory of the motor vehicle to the nearest destination point is free of collisions with trajectories of other objects.

* * * * *